W. HAMLEY.
HORSE-COLLAR.

No. 180,425.

Patented Aug. 1, 1876.

Witnesses;
Grenville Lewis

Inventor
Wm Hamley.
By Hill, Ellsworth & Spear
His Attys.

UNITED STATES PATENT OFFICE.

WILLIAM HAMLEY, OF RIPON, WISCONSIN.

IMPROVEMENT IN HORSE-COLLARS.

Specification forming part of Letters Patent No. 180,425, dated August 1, 1876; application filed May 24, 1876.

*To all whom it may concern:*

Be it known that I, WILLIAM HAMLEY, of Ripon, in the county of Fond du Lac and State of Wisconsin, have invented certain new and useful Improvements in Horse-Collars; and I do hereby declare the following to be a full, clear, and exact description of the same, reference being had to the accompanying drawings, forming part of this specification, in which—

Figure 1:
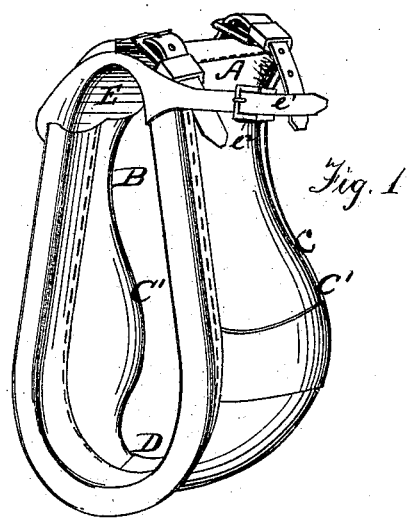
Figure 2:
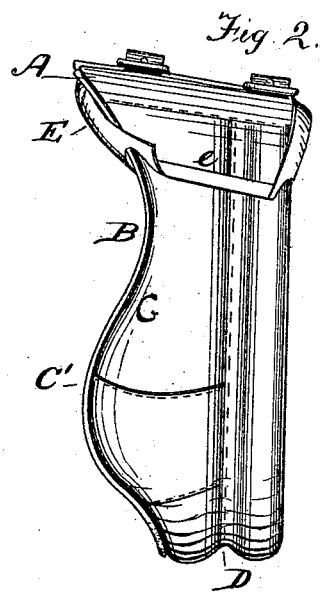

Figure 1 represents a perspective view of the collar complete; Fig. 2, a side elevation of the same, and Fig. 3 a perspective view of the top leather or cap.

Similar letters of reference in the accompanying drawings denote the same parts.

My invention has for its object to improve the construction of horse-collars in respect to rendering them stronger and more comfortable to the animal than those heretofore in use; and to these ends it consists in certain improved details of construction, which I will now proceed to describe and point out in the claims.

Figure 3:
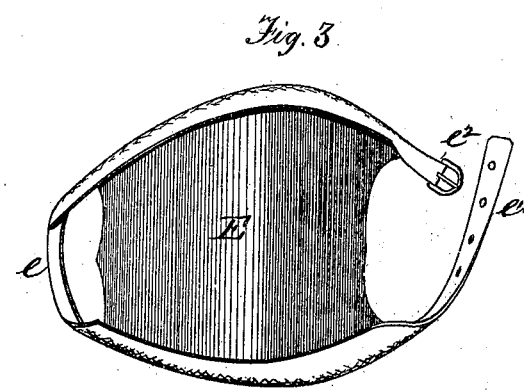

Referring to the drawings, A represents the top of the collar, which is cut wide, full, and at a bevel, so as to afford a very easy bearing on the neck of the animal. The collar is cut away or concaved at B, to give freedom of play to the shoulder-blade, and the side bearings C C are provided with large swells C′ C′, which hold the hame tugs from the sides of the animal, and prevent chafing and abrasion of those parts. I stuff the body of the collar with short straw, or other flexible material, so that the bearing-surfaces C C will yield slightly, and distribute the draft uniformly, while I stuff the throat D with long straw, to give greater strength and durability, and enable it to be made narrow, so as not to interfere with the breathing of the animal. The top leather or cap E is formed of a piece of leather, with the grain side toward the horse, and rolled up before and behind, as seen in Fig. 3, thus affording a smooth, wide bearing on the neck. The cap is applied by drawing the loop $e$ down over the top of one of the sides of the collar, and fastening the fillet $e^1$ and buckle $e^2$ to the other side. This construction obviates the necessity of slipping the loops over the top of the collar every time the latter is put on and taken off, and enables the cap to be kept snug in its place when in use.

To still further strengthen the collar, I prefer to sew it with wire instead of the ordinary material.

The collar as a whole is constructed with special reference to the ease and comfort of the animal. The bearings are so broad that the draft is distributed uniformly, and the use of sweat-pads entirely obviated.

I claim as my invention—

1. In a horse-collar, the wide beveled top and concaves B B, to afford an easy and smooth bearing on the neck of the animal, substantially as described.

2. The horse-collar herein described, having the large swells C′ C′, to prevent the hame-tugs from coming in contact with the animal, and the concaves B to give freedom to the shoulders, substantially as described.

3. In the manufacture of horse-collars, the mode of stuffing the collar by filling the narrow part at the throat with long straw, made to extend through the throat, and the body with short straw, or like flexible material, whereby the throat is strengthened, and the other parts made soft, as set forth.

4. The top leather or cap E, having its grain side toward the animal, and its edges rolled up before and behind, and provided with the loop $e$ and fillet and buckle $e^1$ $e^2$, substantially as described, for the purpose specified.

WILLIAM HAMLEY.

Witnesses:
  G. H. JURREN,
  G. L. RIGGS.